United States Patent
Shinchi

[19]

[11] Patent Number: 6,039,592
[45] Date of Patent: Mar. 21, 2000

[54] METHOD OF FIXING PACKING AND STRUCTURE FOR FIXING PACKING

[75] Inventor: Akira Shinchi, Shizuoka-ken, Japan

[73] Assignee: Yazaki Corporation, Tokyo, Japan

[21] Appl. No.: 09/031,803

[22] Filed: Feb. 27, 1998

[30] Foreign Application Priority Data

Feb. 28, 1997 [JP] Japan .................................. 9-046281

[51] Int. Cl.⁷ ................................................. H01R 13/52
[52] U.S. Cl. ............................................ 439/271; 439/589
[58] Field of Search ................................. 439/271–283, 439/587–598

[56] References Cited

U.S. PATENT DOCUMENTS

| | | |
|---|---|---|
| 4,591,227 | 5/1986 | Colonna . |
| 4,857,007 | 8/1989 | Michaels et al. .................. 439/589 X |
| 5,277,619 | 1/1994 | Yamamoto ......................... 439/589 X |
| 5,380,226 | 1/1995 | Anderson . |

FOREIGN PATENT DOCUMENTS

| | | |
|---|---|---|
| 0 048 930 A1 | 9/1981 | European Pat. Off. . |
| 9803884 | 5/1998 | United Kingdom . |

*Primary Examiner*—Khiem Nguyen
*Attorney, Agent, or Firm*—Finnegan, Henderson, Farabow, Garrett & Dunner, L.L.P.

[57] ABSTRACT

A packing is formed by an elastomer, and a connector housing is formed by a resin having a mutual solubility with the elastomer. The packing is inserted into a cylindrical section of the connector housing, and a flange section of the packing is brought into contact with a bottom section of the cylindrical section. Next, by using an ultrasonic wave horn, a ring-shaped contact section between the flange section and the bottom section is excited by an ultrasonic wave, and the ring-shaped contact section is fused to form a ring-shaped sealing section. Thus, the packing is firmly fixed to the connector housing.

8 Claims, 2 Drawing Sheets

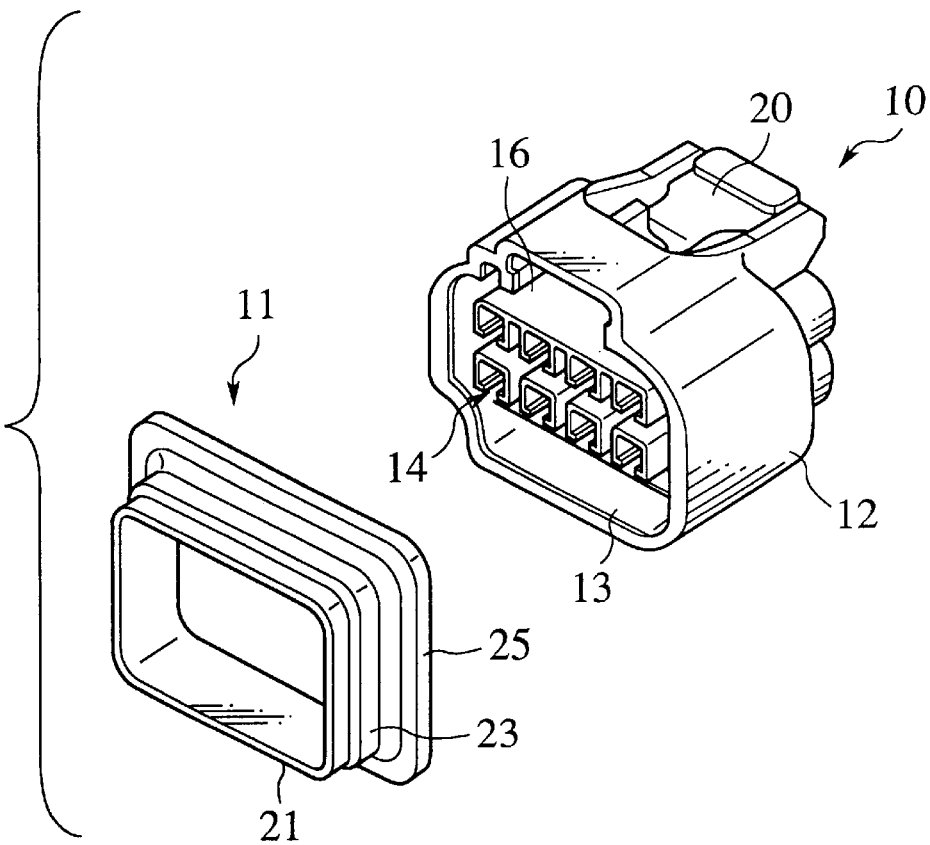
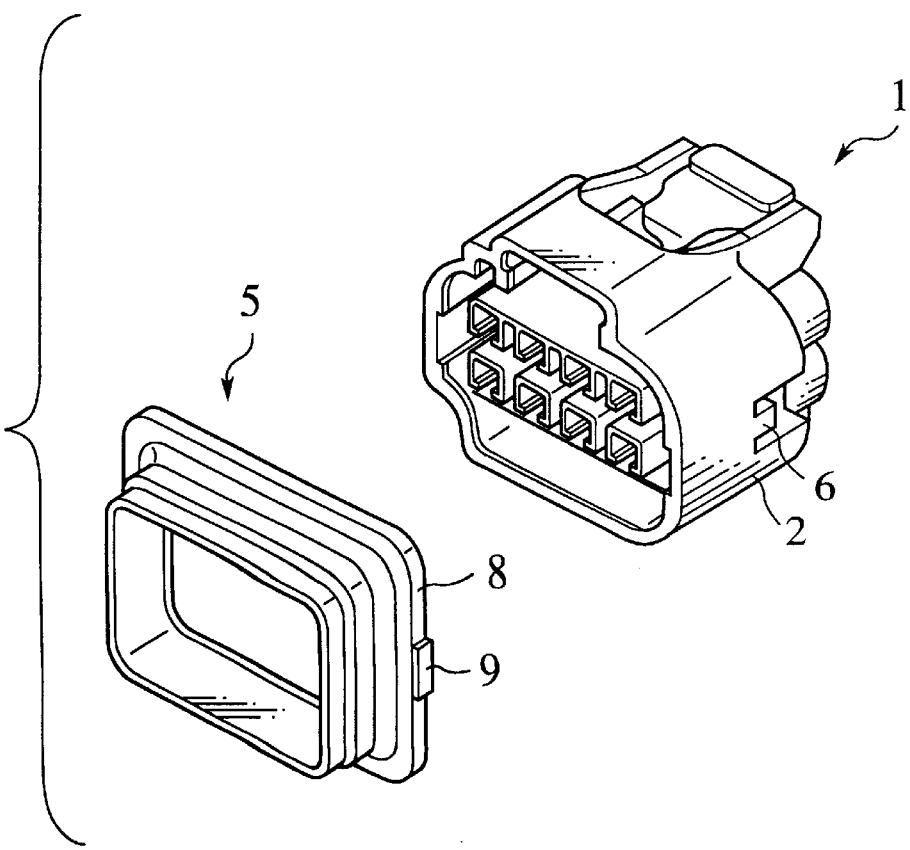

METHOD OF FIXING PACKING AND STRUCTURE FOR FIXING PACKING

BACKGROUND OF THE INVENTION

The present invention relates to a method of fixing a packing and a structure for fixing a packing to be disposed between members, such as a male connector housing and a female connector housing, for example, to be connected together by being mutually engaged with each other, for providing waterproofing to these members.

In connectors to be engaged together by being faced with each other, a packing is disposed at a portion where male and female connector housings are engaged together in order to provide the connectors with waterproofing for preventing an occurrence of a short-circuiting attributable to an entering of rainwater into the connectors.

As a method of fixing a packing between the connector housings, there is a known method for engaging a stopping projection disposed in a packing with a stopping claw disposed in a female connector housing.

When a male connector housing is engaged with the female connector housing mounted with the packing, terminals within the respective connector housings are electrically connected by a mutual contact of the terminals. The packing is sandwiched between the male connector housing and the female connector housing so that the packing provides waterproofing to the portion where the connector housings are engaged together.

SUMMARY OF THE INVENTION

The above-described prior-art structure is for fixing a packing by a mechanical engagement between the stopping projection of the packing and the stopping claw of the connector housing. Therefore, it is not possible to fix firmly the packing to the connector housing, which results in an easy disengagement of the packing.

As a measure for eliminating the above-described inconvenience, there is considered a method for increasing the force of engagement between the packing and the connector housing by reinforcing the engagement claw with an increased thickness or size of the engagement claw or by increasing the number of both the stopping claw and the stopping projection.

However, when the stopping claw is reinforced, a large force is required for engaging the stopping projection with the stopping claw, and this has a trouble in the packing mounting operation. On the other hand, when the number of the stopping claw is increased, the overall strength of the connector housings is lowered.

The above-described problems are generally held by not only the connector housings but also by members which require a packing for the purpose of waterproofing or for structural reasons, and therefore, some means for solving these problems have been required.

The present invention was made by taking the above-described conventional problems into consideration, and it is an object of the present invention to provide a method of fixing a packing and a structure for fixing a packing with strong force and in a simple manner.

In order to achieve the above-described object, according to a first aspect of the present invention, there is provided a method of fixing a packing to the other member, the packing having a ring-shaped flange section, the other member having a contacting section to be brought into contact with the flange section, and the flange section and the contacting section being formed by mutually soluble resins, the method of fixing comprising the steps of:

contacting the flange section of the packing to the contacting section of the other member; and exciting by an ultrasonic wave a ring-shaped contact section between the flange section and the contacting section and fusing the flange section and the contacting section in a ring shape.

The packing and the other member having been formed by the mutually soluble resins are solved and mutually fused by being provided with an energy by means of a heating, an irradiation of an energy wave and an exciting by an ultrasonic wave. Of these energies, the ultrasonic wave exiting is superior to the provision of the other types of energy in the security of fusion, specification of a solving portion, adaptability to a narrow fusing portion and an easy operation. Further, the ultrasonic wave exciting facilitates the fusing in a ring shape of the flange section of the packing and the contacting section of the other member. Further, the fusion is a mutual integration of the members and this has a larger connecting force as compared with a mechanical engagement, ensuring a firm combining at the portion of fusion between the packing and the other member.

Accordingly, by fusing the packing and the other member in a ring shape, they are integrated without any gap at the ring-shaped portion, and the packing is firmly fixed to the other member. As a result, the packing will never be peeled off from the other member.

According to a second aspect of the present invention, there is provided a method of fixing a packing to a connector housing, the packing having a ring-shaped flange section, the connector housing having a cylindrical section with a bottom to be engaged with the other connector, the cylindrical section having a bottom section to be brought into contact with the flange section, and the bottom section and the flange section being formed by mutually soluble resins, the method of fixing comprising the steps of:

contacting the flange section of the packing to the contacting section of the connector housing; and exciting by an ultrasonic wave a ring-shaped contact section between the flange section and the contacting section and fusing the flange section and the contacting section in a ring shape.

When the bottom section of the cylindrical section of the connector housing and the flange section of the packing, both made of mutually soluble resins, are fused in a ring shape with an ultrasonic wave, a ring-shaped sealed section is formed at the cylindrical section and the flange section so that there occurs no entering of water or dusts into the connector housing from the cylindrical section. Further, since the packing is fixed firmly, the packing will never be removed from the cylindrical section even if the connector housing of the other connector is repeatedly mounted to and dismounted from the cylindrical section of the connector housing. Therefore, it is possible to obtain a reliable fixed state.

Further, it is also good to form a ring-shaped groove section at the flange section of the packing and to excite the ring-shaped contact portion by an ultrasonic wave horn to be inserted into the groove section.

According to this structure, it is possible to carry out a fusion by merely inserting the ultrasonic wave horn into the ring-shaped groove section formed in the packing, and the ring-shaped fusion can be done securely. Further, since the packing has a small thickness at the portion where the groove section is formed, the ultrasonic wave works securely to the contacting section of the other member or the cylindrical section of the connector housing, so that the fusion can be carried out easily.

Further, the packing may also be formed by an elastomer.

Since an elastomer has an elasticity in a rubber shape at a temperature near the normal temperature, the elastomer can be closely adhered to the other member or the connector housing satisfactorily, and thus ensures a secure fusion with these members. Further, it is also possible to secure waterproofing and air-tightness by this elasticity.

According to a third aspect of the present invention, there is provided a structure for fixing a packing to the other member, comprising:

a packing having a ring-shaped flange section;

the other member having a contacting section to be contacted to the flange section, the contacting section being formed by a resin having a mutual solubility with the flange section; and a ring-shaped sealing section formed by having the flange section and the contacting section fused by being exited by an ultrasonic wave.

According to this structure, since the flange section of the packing and the contacting section of the other member are integrated together without a gap by the ring-shaped sealing section, a firm fixed state can be obtained without an occurrence of any removal of the packing.

According to a fourth aspect of the present invention, there is provided a structure for fixing a packing to a connector housing, comprising:

a packing having a ring-shaped flange section;

a connector housing having a cylindrical section with a bottom to be engaged with the other connector, the cylindrical section having a bottom section to be brought into contact with the flange section, and the bottom section and the flange section being formed by mutually soluble resins; and a ring-shaped sealing section formed by having the flange section and the contacting section fused together by being exited by an ultrasonic wave.

This structure is for fixing the packing to the connector for accommodating a terminal. Via the ring-shaped sealing section, the flange section of the packing and the cylindrical section of the connector housing are mutually fused to be integrated together so that they are fixed firmly without an occurrence of a removal of the packing. Accordingly, the obtained force of combining is larger than that obtained by a mechanical connection based on the stopping claw or the like. Thus, it is not necessary to increase the combining force by reinforcing the stopping claw or increasing the number of the stopping claw. Further, the strength of the connector housing is not lowered and the structure can be simplified, and the fixing of the packing to the connector housing can be done easily.

The flange section may include a ring-shaped groove formed on the surface at the opposite side of the sealing section.

When the ring-shaped groove section is formed, the ring-shaped sealing section can be formed easily. Further, the packing has a small thickness at the groove section and an ultrasonic wave securely works the cylindrical section of the connector housing, so that the fusion can be carried out securely.

The packing may also be formed by an elastomer.

Since the packing can be closely adhered to the cylindrical section of the connector housing by the elasticity held by the elastomer, it is possible to carry out a secure fusion, which ensures a securing of waterproofing and air-tightness.

BRIEF DESCRIPTION OF THE DRAWINGS

FIG. 1 is an exploded perspective view for showing one mode of implementation of the present invention.

FIG. 3 is a perspective view for showing a modification of FIG. 1.

DESCRIPTION OF THE PREFERRED EMBODIMENTS

Figure 2:
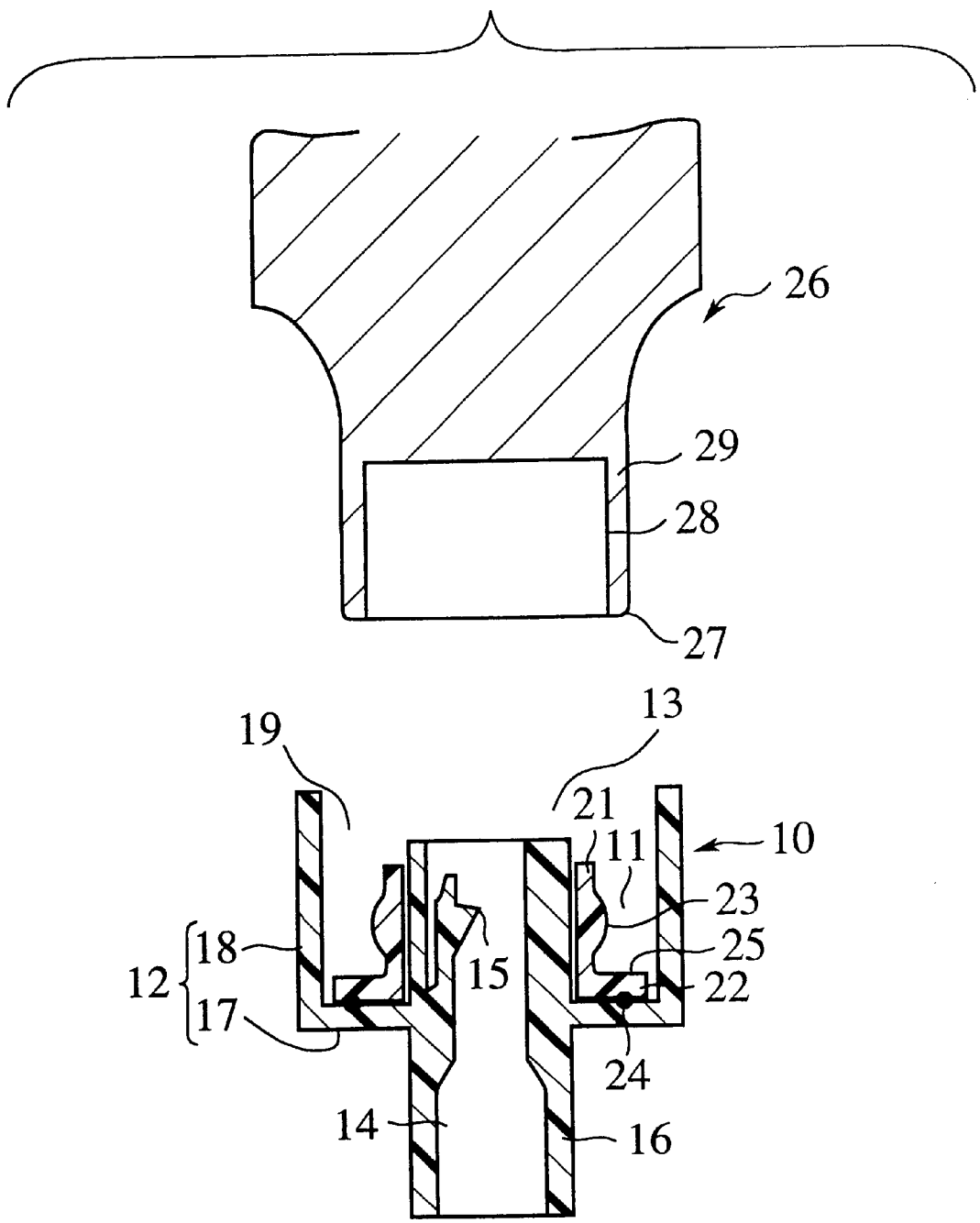
FIG. 2 is a cross sectional view for showing the operation of a fusion.

Embodiments of the present invention will be explained below with reference to the drawings.

FIG. 1 is an exploded perspective view of one mode of embodiment of the present invention applied to a connector, and FIG. 2 is a cross sectional view for showing a fusion operation.

A connector housing 10 is a female type into which a male connector housing of the other connector (not shown) is engaged, and the connector housing 10 has a housing section 16 extending in an axial direction and a cylindrical section 12 disposed at the outside of the housing section 16. A surface of the female connector housing side of the cylindrical section 12 (the left end surface of the drawing) is an open surface 13. A packing 11 and the male connector housing are inserted from the open surface 13.

A plurality of terminal accommodation chambers 14 extending in an axial direction are formed in the housing section 16. Each terminal accommodation chamber 14 is formed in a cylindrical shape and is separated from adjacent accommodation chambers 14. Each terminal accommodation chamber 14 has an opening at both front and rear end sections as shown in FIG. 2. A terminal not shown is inserted into the inside of the terminal accommodation chamber 14. Inside the terminal accommodation chamber 14, a hook section 15 for stopping the terminal from being extracted by being engaged with the terminal is formed in projection. The terminal accommodated in the terminal accommodation chamber 14 is connected with a terminal within the male connector housing.

The cylindrical section 12 of the connector housing 10 has a bottom section 17 and a side wall section 18 as shown in FIG. 2. The bottom section 17 rises perpendicularly from the outer surface of the housing section 16. The side wall section 18 is bent at a right angle toward the open surface 13 from the bottom section 17, and extends to the male connector housing side from the housing section 16. A space section for engagement 19 is formed between the cylindrical section 12 and the housing section 16. The packing 11 is inserted and fixed within the space section for engagement. A lock arm 20 for connecting the male connector and the housing is provided on the outer surface of the rear side of the housing 16 as shown in FIG. 1.

The whole of the packing 11 is formed in a rectangular ring shape. This packing 11 has a main body section 21 extending in the direction of the male connector housing and a flange section 22 continuously provided in integration at an end portion of the main body section 21 at the side of the connector housing 10.

The inner diameter of the main body section 21 is set at a value at which the housing section 16 of the connector housing 10 is inserted. When the housing 16 is inserted into the main body section 21, the main body section 21 covers the housing section 16 along the outer surface of the housing section 16, so that the main body section 21 exists between the connector housing inserted into the space section for engagement 19 and the housing section 16, to carry out waterproofing. A boss section 23 protruded in a ring shape is formed at an intermediate portion of the main body section 21 in the length direction, and this boss section 23 is closely adhered to the male connector housing elastically.

The flange section 22 has a ring shape protruded in an outer direction of the main body section 21 by being bent at a right angle to the outer direction from the end portion of the main body section 21. The flange section 22 is brought into contact with the bottom section 17 of the cylindrical section 12, and is fused with the bottom section 17 with an ultrasonic wave exiting in this contacted state as described later. In FIG. 2, 24 denotes a sealing section formed in a ring shape by the fusion with the ultrasonic wave exciting.

A groove section 25 is formed in a ring shape on the surface of the flange section 22 at the opposite side of the surface on which the sealing section 24 is formed. The groove section 25 is for inserting a front end 27 of an ultrasonic wave horn 26 to be described later. When the front end 27 is inserted into the groove section 25, a relative positioning of the ultrasonic wave horn 26 and the packing 11 can be carried out securely and simply. Further, since the groove section 25 is formed in a thin thickness, an ultrasonic wave can be worked efficiently to the bottom section 17. Thus, an ultrasonic wave fusion can be carried out in a short time.

The ultrasonic wave horn 26 oscillates an ultrasonic wave by being connected with an ultrasonic wave oscillator not shown. At the front end portion of the ultrasonic wave horn 26, there are formed a recess section 28 into which the housing section 16 and the main body section 21 of the packing 11 are inserted and a ring-shaped horn section 29 to be inserted into the cylindrical section 12. At the time exciting an ultrasonic wave, the front end 27 of the horn section 29 is inserted into the groove section 25 of the packing 11 and is contacted with the flange section 22.

In the above structure, the packing 11 and the connector housing 10 are formed by mutually soluble resins. The packing 11 is formed by a resin having an elasticity. As a resin having an elasticity, an elastomer having an elasticity at a temperature near the normal temperature and with an abrasion proof is satisfactory. An elastomer made of polyisobutylene series, polyethylene series and polyester series or the like can be selected. Further, as an elastomer taking insulation and durability into consideration for the packing 11, an elastomer of a polyester series (a product name "HITOLER" (manufactured by Toray Du Pont) is satisfactory.

When the above-described elastomers are used, a secure waterproofing can be carried out because the packing 11 has a satisfactory elasticity. Since the packing 11 is to be fused with the connector housing 10, a material which is not soluble with the resin of the connector housing 10, such as rubber and a synthetic rubber, for example, is not desirable for the packing 11.

On the other hand, as the material to be used for the connector housing 10, any kind of resin may be used so long as the resin has insulation and strength and has solubility with the packing 11. For example, when the above-described elastomer of a polyester series is used for the packing 11, polybutylene telephthalate (PBT) having solubility with this elastomer can be used for the connector housing 10.

The method of fixing the packing according to the mode of implementation of the present invention will be explained next. As shown in FIG. 1, the packing 11 is disposed so that the flange section 22 faces the cylindrical section 12 of the connector housing 10, and the flange section 22 is inserted into the space section for engagement 19 from the open surface 13. In this insertion, the main body section 21 of the packing 11 is slid along the outer surface of the housing section 16 and the flange section 22 of the packing 11 is brought into contact with the bottom section 17 of the cylindrical section 12.

When the flange section 22 has been brought into contact with the bottom section 17, the main body section 21 of the packing 11 stops in the state that the main body section 21 has covered the housing section 16, as shown in FIG. 2. Thereafter, the horn section 29 of the ultrasonic wave horn 26 is inserted into the space section for engagement 19 of the cylindrical section 12. The horn section 29 accommodates into the recess section 28 the housing section 16 and the main body section 21 of the packing 11 having covered the housing section 16, and proceeds into the space section for engagement 19, and then stops by having its front end 27 inserted into the groove section 25 of the packing 11.

In this state, the flange section 22 of the packing 11 is kept in contact with the bottom section 17 of the cylindrical section 12, and the ultrasonic wave horn 26 excites an ultrasonic wave in this state. By this exciting of the ultrasonic wave, an oscillation of the ultrasonic wave from the groove section 25 works to the flange section 22 and the bottom section 17, so that the ring-shaped contact portions of the flange section 22 and the bottom section 17 are fused together and the ring-shaped sealing section 24 is formed along the edge portion of the front end 27 of the horn section 29. Thus, the packing 11 and the cylindrical section 12 are connected by the sealing section 24 and the packing 11 is fixed to the connector housing 10. In this case, the ultrasonic wave exciting can be carried out efficiently by contacting a receiving base (not shown) to the outer surface of the bottom section 17 of the cylindrical section 12 at the side opposite to the side where the ultrasonic wave horn 26 is inserted.

With the above-described fixing, the packing 11 and the cylindrical section 12 of the connector housing 10 have mutual solubility, and the mutually fused sealing section 24 is formed at the contacting portion by the ultrasonic wave. The packing 11 is fixed to the cylindrical section 12 by this sealing section 24. Since the packing 11 is fixed with a larger combining force than a mechanical stopping force obtained by the stopping claw or the like, the packing 11 will never be removed, and no stopping claw for stopping is required. As a result, reinforcing of any stopping claw or increasing the number of such stopping claw is not necessary. Moreover, the strength of the connector housing is not lowered and the fixing can be done simply.

The above-described fixing method can be applied directly to a fixing structure shown in FIG. 3. As shown in FIG. 3, a packing 5 having a stopping projection 9 is inserted into a cylindrical section 2 of a connector housing 1 having a stopping claw 6, and a holding frame 8 of the resin-made packing 5 and the cylindrical section 2 are fused by being excited by an ultrasonic wave so that the packing 5 is fixed to the housing 1. With this arrangement, the above-described fixing method according to the ultrasonic wave exciting can also be used directly to the structure of mounting the packing 5 in the connector housing 1 based on the engagement of the stopping claw 6 with the stopping projection 9. Accordingly, the above-described fixing method can be used widely. In this case, the stopping claw 6 and the stopping projection 9 may be left as they are or may be omitted.

Not only to the connector housing, but the present invention can also be applied similarly to those members which require a packing for obtaining waterproofing or airtightness or for structural or any other reasons. In the case of members for other than the connector housing, a packing can be fixed securely in a similar manner, by forming a contacting section to the other member to which the packing is mounted, then contacting the flange section of the packing to this contacting section and fusing these together with an ultrasonic wave.

What is claimed is:

1. A method of fixing a packing to a member, said packing having a ring-shaped flange section, said flange including a ring-shaped groove section, said member having a contacting section capable of being brought into contact with said flange section, and said flange section and said contacting section being formed by mutually soluble resins, said method of fixing comprising the steps of:

contacting said flange section of said packing to said contacting section of said member;

inserting an ultrasonic horn into the ring-shaped groove section of said flange section; and exciting by an ultrasonic wave from the ultrasonic horn a ring-shaped contact section between said flange section and said contacting section and fusing said flange section and said contacting section in a ring shape.

2. A method of fixing a packing to a connector housing, said packing having a ring-shaped flange section, said flange section including a ring-shaped groove section, said connector housing having a cylindrical section capable of being engaged with another connector, said cylindrical section having a bottom section capable of being brought into contact with said flange section, and said bottom section and said flange section being formed by mutually soluble resins, said method of fixing comprising the steps of:

contacting said flange section of said packing to said bottom section of said connector housing;

inserting an ultrasonic horn into the ring-shaped groove section of said flange section; and exciting by an ultrasonic wave from the ultrasonic horn a ring-shaped contact section between said flange section and said bottom section and fusing said flange section and said bottom section in a ring shape.

3. A method of fixing a packing to a member according to claim 1, wherein said packing is formed by an elastomer.

4. A method of fixing a packing to a connector housing according to claim 2, wherein said packing is formed by an elastomer.

5. A structure for fixing a packing to a member, comprising:

a packing having a ring-shaped flange section;

a member having a contacting section capable of being brought into contact with said flange section, said contacting section being formed by a resin having a mutual solubility with said flange section; and a ring-shaped sealing section formed by having said flange section and said contacting section fused by being excited by an ultrasonic wave, wherein said flange section includes a ring-shaped groove section formed on a surface opposite to said sealing section.

6. A structure for fixing a packing to a connector housings comprising:

a packing having a ring-shaped flange section;

a connector housing having a cylindrical section capable of being engaged with another connector, said cylindrical section having a bottom section capable of being brought into contact with said flange section, and said bottom section and said flange section being formed by mutually soluble resins; and a ring-shaped sealing section formed by having said flange section and said bottom section fused together by being excited by an ultrasonic wave, wherein said flange section includes a ring-shaped groove section formed on a surface opposite to said sealing section.

7. A structure for fixing a packing to a member according to claim 5, wherein said packing is formed by an elastomer.

8. A structure for fixing a packing to a connector housing according to claim 6, wherein said packing is formed by an elastomer.

* * * * *

UNITED STATES PATENT AND TRADEMARK OFFICE
CERTIFICATE OF CORRECTION

PATENT NO. : 6,039,592
DATED : March 21, 2000
INVENTOR(S) : Shinchi

It is certified that error appears in the above-identified patent and that said Letters Patent is hereby corrected as shown below:

<u>Column 7</u>,
Line 11, after "flange" (second occurrence), insert -- section --.

<u>Column 8</u>,
Line 20, "housings", should read -- housing, --.

Signed and Sealed this

Twenty-first Day of August, 2001

Attest:

*Nicholas P. Godici*

NICHOLAS P. GODICI
*Attesting Officer*     *Acting Director of the United States Patent and Trademark Office*